United States Patent
Chen et al.

(10) Patent No.: US 11,985,399 B2
(45) Date of Patent: May 14, 2024

(54) PHOTOGRAPHING APPARATUS AND INSPECTION DEVICE

(71) Applicant: SICHUAN ENERGY INTERNET RESEARCH INSTITUTE, TSINGHUA UNIVERSITY, Sichuan (CN)

(72) Inventors: Yongcan Chen, Sichuan (CN); Hua Zhang, Sichuan (CN); Haoran Wang, Sichuan (CN); Yonglong Li, Sichuan (CN); Jialong Li, Sichuan (CN); Zhaowei Liu, Sichuan (CN); Shuang Wang, Sichuan (CN)

(73) Assignee: SICHUAN ENERGY INTERNET RESEARCH INSTITUTE, TSINGHUA UNIVERSITY, Sichuan (CN)

( * ) Notice: Subject to any disclaimer, the term of this patent is extended or adjusted under 35 U.S.C. 154(b) by 451 days.

(21) Appl. No.: 17/438,970

(22) PCT Filed: May 25, 2020

(86) PCT No.: PCT/CN2020/092054
§ 371 (c)(1),
(2) Date: Sep. 14, 2021

(87) PCT Pub. No.: WO2020/244400
PCT Pub. Date: Dec. 10, 2020

(65) Prior Publication Data
US 2022/0150387 A1    May 12, 2022

(30) Foreign Application Priority Data

Jun. 5, 2019 (CN) .......................... 201910488289.9

(51) Int. Cl.
*H04N 23/51* (2023.01)
*B63B 35/00* (2020.01)
(Continued)

(52) U.S. Cl.
CPC ............. *H04N 23/51* (2023.01); *B63B 35/00* (2013.01); *B63B 39/00* (2013.01); *G03B 15/03* (2013.01);
(Continued)

(58) Field of Classification Search
CPC ...... H04N 23/51; H04N 23/695; H04N 23/54; H04N 23/56; H04N 23/52; H04N 23/57; B63B 35/00; B63B 39/00; G03B 15/03
(Continued)

(56) References Cited

U.S. PATENT DOCUMENTS 5,369,455 A * 11/1994 Mayer .................... G03B 15/00
396/535
2003/0058738 A1* 3/2003 Erikson .................. G03B 42/06
367/7
(Continued)

FOREIGN PATENT DOCUMENTS

| CN | 201042751 Y | 4/2008 |
|---|---|---|
| CN | 201251671 Y | 6/2009 |

(Continued)

OTHER PUBLICATIONS

Li et al., Application status and development trend of underwater robot in water and hydropower engineering detection, Journal of China Institute of Water Resources and Hydropower Research, Dec. 2018, pp. 586-590, vol. 16 No. 6.
(Continued)

*Primary Examiner* — Matthew David Kim
(74) *Attorney, Agent, or Firm* — IP & T GROUP LLP

(57) ABSTRACT

A photographing apparatus and an inspection device are provided. The photographing apparatus comprises a camera,
(Continued)

a light supplementing structure, and a closed housing; the camera is provided with a lens, and positioned in and connected to the housing; the housing is provided with at least one photographing portion configured to be attached to an object to be photographed, and a space is formed between the lens and the photographing portion; the light supplementing structure is positioned in and connected to the housing, the light supplementing structure is configured to emit light to said object through the space and the photographing portion, and the lens is configured to capture an image of said object via the photographing portion. The inspection device comprises a rack and the photographing apparatus, and the housing is connected to the rack.

8 Claims, 4 Drawing Sheets

(51) Int. Cl.
  *B63B 39/00* (2006.01)
  *G03B 15/03* (2021.01)
  *H04N 23/52* (2023.01)
  *H04N 23/54* (2023.01)
  *H04N 23/56* (2023.01)
  *H04N 23/57* (2023.01)
  *H04N 23/695* (2023.01)

(52) U.S. Cl.
  CPC ............ *H04N 23/52* (2023.01); *H04N 23/54* (2023.01); *H04N 23/56* (2023.01); *H04N 23/57* (2023.01); *H04N 23/695* (2023.01)

(58) Field of Classification Search
  USPC ........................................................ 348/81
  See application file for complete search history.

(56) References Cited

U.S. PATENT DOCUMENTS

| | | | | |
|---|---|---|---|---|
| 2004/0070770 | A1* | 4/2004 | Desharnais | G01V 1/3835 356/614 |
| 2009/0231430 | A1* | 9/2009 | Buschmann | B60Q 1/0023 348/148 |
| 2015/0108282 | A1* | 4/2015 | Kanaoka | G05D 1/0038 244/23 A |
| 2015/0211368 | A1* | 7/2015 | Kalwa | B63G 8/001 37/309 |
| 2015/0274089 | A1* | 10/2015 | Schütz | B60R 11/04 224/567 |
| 2017/0136962 | A1* | 5/2017 | Morita | B60R 1/00 |
| 2018/0010964 | A1* | 1/2018 | Chen | G01J 3/06 |
| 2018/0284575 | A1* | 10/2018 | Sugaki | H04N 23/52 |
| 2019/0187712 | A1* | 6/2019 | Firmin | G05D 1/0206 |
| 2021/0129959 | A1* | 5/2021 | Walpurgis | G03B 17/08 |

FOREIGN PATENT DOCUMENTS

| | | | |
|---|---|---|---|
| CN | 103134479 | A | 6/2013 |
| CN | 203120023 | U | 8/2013 |
| CN | 106131388 | A | 11/2016 |
| CN | 107052002 | A | 8/2017 |
| CN | 206615369 | U * | 11/2017 |
| CN | 206615369 | U | 11/2017 |
| CN | 108093163 | A | 5/2018 |
| CN | 207300864 | U | 5/2018 |
| CN | 108810391 | A | 11/2018 |
| CN | 109348191 | A | 2/2019 |
| CN | 110012207 | A | 7/2019 |
| CN | 110871448 | A | 3/2020 |
| JP | 2008236589 | A | 10/2008 |
| KR | 10-2018-0106585 | A | 10/2018 |

OTHER PUBLICATIONS

Notification to Grant Patent Right for Invention of priority application No. CN 201910488289.9 dated Aug. 15, 2019.
First Office Action issued for priority application No. CN 201910488289.9 dated Jul. 31, 2019.
First search of priority application No. CN 2019104882899 dated Jul. 25, 2019.
Supplementary search of priority application No. CN 2019104882899 dated Aug. 13, 2019.

* cited by examiner

PHOTOGRAPHING APPARATUS AND INSPECTION DEVICE

CROSS-REFERENCE TO RELATED APPLICATION

This application is a national stage application of PCT/CN2020/092054 filed on May 25, 2020, which claims the priority to the Chinese patent application with the filing No. CN201910488289.9, filed on Jun. 5, 2019 with the Chinese Patent Office, and entitled "Photographing Apparatus and Inspection Device", the contents of which are incorporated herein by reference in entirety.

TECHNICAL FIELD

The present disclosure relates to the field of acquisition apparatuses, and in particular, relates to a photographing apparatus and an inspection device.

BACKGROUND ART

In the prior art, there is still no apparatus capable of performing underwater photographing and inspection in a muddy water area.

SUMMARY

Objectives of the present disclosure include, for example, providing a photographing apparatus, which can solve the problem of underwater photographing in a muddy water area.

Objectives of the present disclosure further include providing an inspection device, which can solve the problem of underwater photographing and inspecting in a muddy water area.

Embodiments of the present disclosure may be realized as follows:

An embodiment of the present disclosure provides a photographing apparatus, including:
a camera, a light supplementing structure, and a closed housing,
wherein the camera is provided with a lens, and the camera is located in the housing and connected to the housing; the housing has at least one photographing portion, the photographing portion is configured to be attached to a to-be-photographed object, and a space is formed between the lens and the photographing portion; and the light supplementing structure is located in the housing and connected to the housing, the light supplementing structure is configured to emit light to the to-be-photographed object through the space and the photographing portion, and the lens is configured to shoot an image of the to-be-photographed object via the photographing portion.

Optionally, the light supplementing structure includes a light supplementing lamp strip, and the light supplementing lamp strip is provided circumferentially around the photographing portion; and the lens is arranged towards a middle region of the photographing portion, and is configured to shoot an image of the to-be-photographed object via the middle region.

Optionally, the light supplementing structure further includes a light supplementing lamp; and
light emitted from the light supplementing lamp is parallel to an inner wall of the photographing portion.

Optionally, the housing is of a rectangular parallelepiped structure, and a bottom plate of the housing forms the photographing portion.

Optionally, the photographing apparatus further includes an insulating plate, the insulating plate is located in the housing and connected to the housing, a space is formed between the insulating plate and the bottom plate, and the camera is mounted on the insulating plate.

An embodiment of the present disclosure further provides an inspection device, wherein the inspection device includes a rack and the photographing apparatus; and
the housing is connected to the rack.

Optionally, the inspection device further includes a lifting device provided on the rack; and
the housing is slidably connected to the rack, and the lifting device is configured to drive the housing to reciprocally move up and down so that the photographing portion is away from or close to the to-be-photographed object.

Optionally, the inspection device further includes a dredging device provided on the rack; and
an image acquisition region is formed on a side of the photographing portion away from the space, and the dredging device is configured to agitate coverings around the image acquisition region, so that the to-be-photographed object covered by the coverings is exposed in the image acquisition region.

Optionally, the inspection device further includes a photographing camera; and
the photographing camera is connected to the rack and has an adjustable photographing angle, so as to photograph different positions of the image acquisition region.

Optionally, the inspection device further includes a buoyancy adjustable device provided on the rack to balance a state of the rack in water Beneficial effects of the photographing apparatus and the inspection device of the embodiments of the present disclosure include, for example:
in the muddy water area, the transparent photographing portion is attached to the to-be-photographed object, and under the effect of the light supplementing structure, the lens is enabled to photograph, through the space and the photographing portion, the to-be-photographed object via the photographing portion, thus realizing underwater photographing and inspection in the muddy water area.

BRIEF DESCRIPTION OF DRAWINGS

In order to more clearly illustrate technical solutions of embodiments of the present disclosure, accompanying drawings which need to be used in the embodiments will be briefly introduced below, and it should be understood that the accompanying drawings below merely show some embodiments of the present disclosure, and therefore should not be considered as limitation on the scope, and a person ordinarily skilled in the art still could obtain other relevant accompanying drawings according to these accompanying drawings, without using any creative effort.

Figure 1:
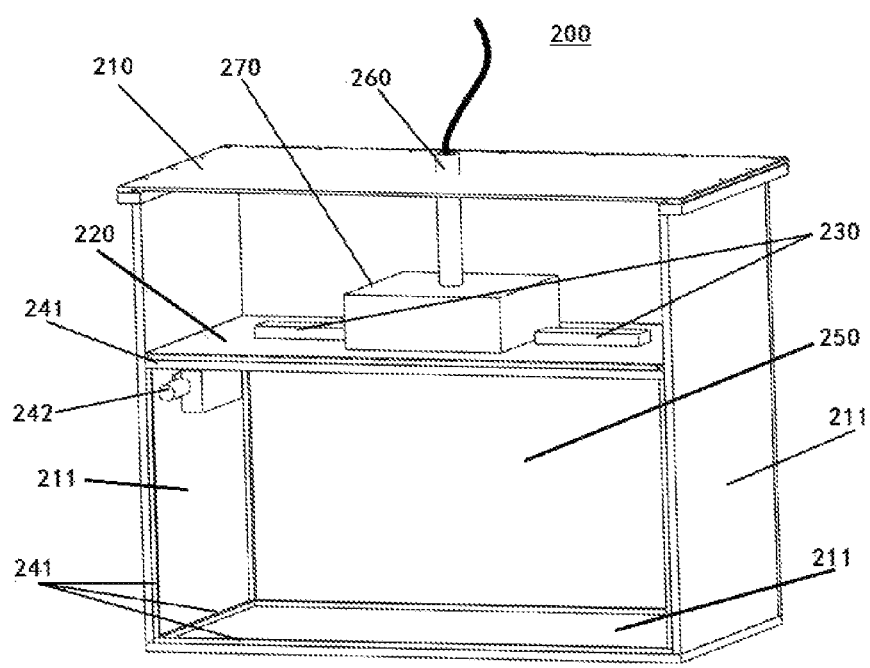
FIG. 1 is a structural schematic view of a photographing apparatus provided in an embodiment of the present disclosure.

Reference signs: 001—inspection device; 100—rack; 200—photographing apparatus; 210—housing; 211—photographing portion; 220—insulating plate; 230—camera; 241—light supplementing lamp strip; 242—light supplementing lamp; 250—space; 260—waterproof connector; 270—control module; 300—lifting device; 310—waterproof electric push rod; 320—linear bearing; 330—polish rod; 400—dredging device; 410—dredging pipe; 420—dredging propeller; 430—filtering screen; 500—first propeller; 501—second propeller; 600—photographing camera; 610—mounting bracket; 620—underwater light supplementing lamp; 630—arc-shaped notch; 700—buoyancy adjustable device; 701—buoyancy block; 800—waterproof track; 900—underwater acoustic positioning mechanism.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below in conjunction with the accompanying drawings in the embodiments of the present disclosure, and apparently, some but not all embodiments of the present disclosure are described. Generally, components in the embodiments of the present disclosure described and shown in the accompanying drawings herein may be arranged and designed in various different configurations.

Therefore, the following detailed description of the embodiments of the present disclosure provided in the accompanying drawings is not intended to limit the scope of protection of the present disclosure, but merely represents chosen embodiments of the present disclosure. Based on the embodiments of the present disclosure, all of other embodiments obtained by those ordinarily skilled in the art without using any creative efforts shall fall within the scope of protection of the present disclosure.

It should be noted that similar reference signs and letters represent similar items in the following accompanying drawings, therefore, once a certain item is defined in one accompanying drawing, it is unnecessary to be further defined or explained in subsequent accompanying drawings.

In the description of the present disclosure, it should be noted that orientation or positional relationships indicated by terms such as "upper", "lower", "inner", and "outer" are based on orientation or positional relationships as shown in the drawings, or orientation or positional relationships of a product when being conventionally placed in use, merely for facilitating describing the present disclosure and simplifying the description, rather than indicating or suggesting that related devices or elements have to be in the specific orientation or configured and operated in a specific orientation, therefore, they should not be construed as limitation to the present disclosure.

Besides, terms such as "first" and "second", if appear, are merely used for distinguishing the description, but should not be construed as indicating or implying importance in the relativity.

It should be noted that the features in the embodiments of the present disclosure may be combined with each other without conflict.

An embodiment of the present disclosure provides a photographing apparatus 200, at least configured to realize underwater photographing in a muddy water area.

Referring to FIG. 1, FIG. 1 is a structural schematic view of the photographing apparatus 200 provided in an embodiment of the present disclosure. An embodiment of the present disclosure provides a photographing apparatus 200, including: a camera 230, a light supplementing structure, and a closed housing 210; the camera 230 is provided with a lens, and the camera 230 is located in the housing 210 and connected to the housing 210; the housing 210 has at least one photographing portion 211, the photographing portion 211 is configured to be attached to an to-be-photographed object, and a space 250 is formed between the lens and the photographing portion 211; the light supplementing structure is located in the housing 210 and connected to the housing 210, the light supplementing structure is configured to emit light to the to-be-photographed object through the space 250 and the photographing portion 211, and the lens is configured to shoot an image of the to-be-photographed object via the photographing portion 211.

It should be noted that the to-be-photographed object may be an object in the air, water, or land. In the present embodiment, description is made mainly by taking a to-be-photographed object in water as an example. Functions of the photographing portion 211 include separating air inside the housing 210 from environment outside the housing 210, wherein a material of the photographing portion is non-opaque, and does not block photographing of the camera 230, for example, the photographing portion 211 is made of a transparent material, and a suitable transparency range may be selected according to actual use environments. Functions of the light supplementing structure include supplementing light for photographing of the camera 230. The camera 230 may adopt a photographic camera 230, a video camera, a depth camera 230 or a binocular camera 230, wherein the depth camera 230 and the binocular camera 230 are adopted, a two-dimensional image, a three-dimensional depth image, and a three-dimensional point cloud image of the to-be-photographed object can be synchronously generated, and the three images can be matched with each other, so that acquired underwater image and surface three-dimensional features of the to-be-photographed object can be synchronously analyzed and quantified. The depth camera 230 and the binocular camera 230 can reflect underwater three-dimensional features, and solve the problem that an underwater two-dimensional picture cannot reflect flatness information and cannot visually reflect three-dimensional quantitative feature information of the to-be-photographed object. It is also feasible to adopt two or more lens assemblies to achieve effect equivalent to that of the depth camera 230 and the binocular camera 230. As shown in the drawing, two depth cameras 230 are provided, which helps to enlarge the field of view of photographing, and the two depth cameras 230 are symmetrically provided, then the photographing range is wider, and the effect is better.

The operation principle of the photographing apparatus 200 provided in the present embodiment is as follows: with continued reference to FIG. 1, the photographing portion 211 is attached to the to-be-photographed object, and under the effect of the light supplementing structure, there is light in the space 250 between the lens and the photographing portion 211, such that the to-be-photographed object can also be irradiated via the photographing portion 211, and therefore, the lens can shoot, through the space 250 and the photographing portion 211, the to-be-photographed object via the photographing portion 211, so as to perform quantitative analysis on the to-be-photographed object. When the to-be-photographed object is located in a muddy environment (muddy air environment, muddy water area or sludgy environment), the photographing apparatus 200 provided in the embodiment of the present disclosure may be used (the photographing apparatus certainly also may be used when the external environment is not muddy, in this case, light in the space 250 is not only provided by the light supplementing structure, but also by natural light outside the housing 210, and in the muddy environment, the light in the space 250 also partly comes from natural light outside the housing 210, but compared with the environment that is not muddy, less or almost no light in the space 250 in the muddy environment comes from natural light outside), and the photographing portion 211 can separate air inside the housing 210 from the muddy environment outside the housing 210. For example, in the muddy water area, the housing 210 is moved, so that the photographing portion 211 is attached to a bottom under water, then the lens can shoot, through the space 250 and the photographing portion 211, the environment underwater via the photographing portion 211, thus realizing the underwater bottom photographing and inspection (i.e. photographing and inspection near the bottom underwater).

Optionally, with continued reference to FIG. 1, the housing 210 is of a rectangular parallelepiped structure, and a bottom plate of the housing 210 forms the photographing portion 211. The housing 210 is sealed and can be waterproof. For a manner of providing the photographing portion 211, for example, the housing 210 includes a first plate, a second plate, a third plate, and a fourth plate hermetically connected in sequence, and two ends are sealed by a fifth plate and a sixth plate, wherein the third plate serves as the photographing portion 211, or the second plate, the third plate, and the fourth plate together serve as the photographing portion 211, or the second plate, the third plate, the fourth plate, the fifth plate, and the sixth plate together serve as the photographing portion 211, or the first plate, the second plate, the third plate, the fourth plate, the fifth plate, and the sixth plate together serve as the photographing portion 211.

Optionally, with continued reference to FIG. 1, a top portion (the first plate) of the housing 210 is provided as a sealing cover, and the remaining portions (the second plate, the third plate, the fourth plate, the fifth plate, and the sixth plate) of the housing 210 form the photographing portion 211, and a sealed structure is formed by the sealing cover and the transparent photographing portion 211. Functions of the photographing portion 211 include forming, in combination with the sealing cover, the sealed structure with air inside.

Optionally, with continued reference to FIG. 1, a waterproof connector 260 is fixed on the sealing cover. Functions of the waterproof connector 260 include leading out cable(s) of equipment inside the housing 210 or charging a battery inside the housing 210 when needed. Optionally, the waterproof connector 260 employs a composite cable in which various cables, including a power supply cable, a communication cable, and a force bearing cable, are combined and sealed in the housing 210.

Optionally, with continued reference to FIG. 1, the photographing apparatus 200 further includes an insulating plate 220, the insulating plate 220 is located in the housing 210 and connected to the housing 210, the space 250 is formed between the insulating plate 220 and the bottom plate, and the camera 230 is mounted on the insulating plate 220. Optionally, two ends of the insulating plate 220 are connected to the second plate and the fourth plate. Optionally, all electrical devices are mounted on the insulating plate 220, the electrical devices include a control module 270, the binocular camera 230, and so on, and the control module 270 includes components such as a battery and a controller therein, with functions including supplying power to the depth camera 230, a motor, the light supplementing structure and so on, controlling the image acquisition of the depth camera 230, and controlling the light supplementing structure to adjust an illumination angle of supplemented light.

Optionally, with continued reference to FIG. 1, the light supplementing structure includes a light supplementing lamp strip 241, and the light supplementing lamp strip 241 is provided circumferentially around the photographing portion 211; the lens is arranged towards a middle region of the photographing portion 211, and is configured to shoot an image of the to-be-photographed object via the middle region. For example, the third plate serves as the photographing portion 211, the middle region of the third plate refers to a position in the middle region of the photographing portion 211, the light supplementing lamp strip 241 is provided along an edge of the second plate, and the light supplementing lamp strip 241 may also be additionally provided at corners where the insulating plate 220 intersects the second plate and the fourth plate; the second plate, the third plate, and the fourth plate serve as the photographing portion 211, a middle region of the second plate refers to the position in the middle region of the photographing portion 211, a middle region of the third plate refers to the position in the middle region of the photographing portion 211, and a middle region of the fourth plate refers to the position in the middle region of the photographing portion 211. The light supplementing lamp strip 241 is provided along edges of the second plate, the third plate, and the fourth plate respectively, and the light supplementing lamp strip 241 may also be additionally provided at corners where the insulating plate 220 intersects the second plate and the fourth plate. Functions of the light supplementing lamp strip 241 include supplementing light for the depth camera 230 when shooting an image underwater, wherein the light supplementing lamp strip 241, with a wide coverage area and being uniformly distributed, will not lead to light condensation, and compared with the conventional light supplementation, the light supplementing lamp strip 241 can make the light more uniform, and will neither generate strong reflected light, nor cause light spots in a photographed picture.

Optionally, with continued reference to FIG. 1, the light supplementing structure further includes a light supplementing lamp 242; and light emitted from the light supplementing lamp 242 is parallel to an inner wall of the photographing portion 211. It is also possible to provide a plurality of light supplementing lamps 242, so that light of the light supplementing lamps 242 is mutually offset, and no light-focusing spot is formed on the photographing portion 211, that is, there will be no light spot in the photographed picture. Optionally, the third plate serves as the photographing portion 211, and the light of the light supplementing lamp 242 is parallel to the third plate, and perpendicular to the second plate and the third plate. When the second plate and the third plate serve as the photographing portion 211, the light supplementing lamp 242 is perpendicular to the second plate and the fourth plate, and it is quite likely to form a light-focusing spot on the second plate and the fourth plate, resulting in a light spot in the formed picture, in this case, a light direction of the light supplementing lamp 242 may be changed so that it is parallel to the second plate and the fourth plate.

Optionally, with continued reference to FIG. 1, the light supplementing lamp 242 is rotatably connected to the housing 210 and driven by a motor, and has an adjustable angle, and the motor is controlled by the control module 270 on the insulating plate 220. Optionally, referring to the drawings, the number of light supplementing lamps 242 is two, and the two light supplementing lamps 242 are symmetrically provided on two sides of the lens, and located at an intersection of the insulating plate 220 and the second plate and an intersection of the insulating plate and the fourth plate, respectively. Functions of the light supplementing lamp 242 include: auxiliary enhancing the light supplementing effect of the light supplementing lamp strip 241. Compared with the conventional fixed light supplementing lamp 242, such light supplementation with an adjustable angle can make the photographing apparatus 200, when being operated on unmanned equipment, be capable of changing the illumination angle of supplemented light according to an operation situation and an operator's subjective judgment, enabling more flexibility.

Figure 2:
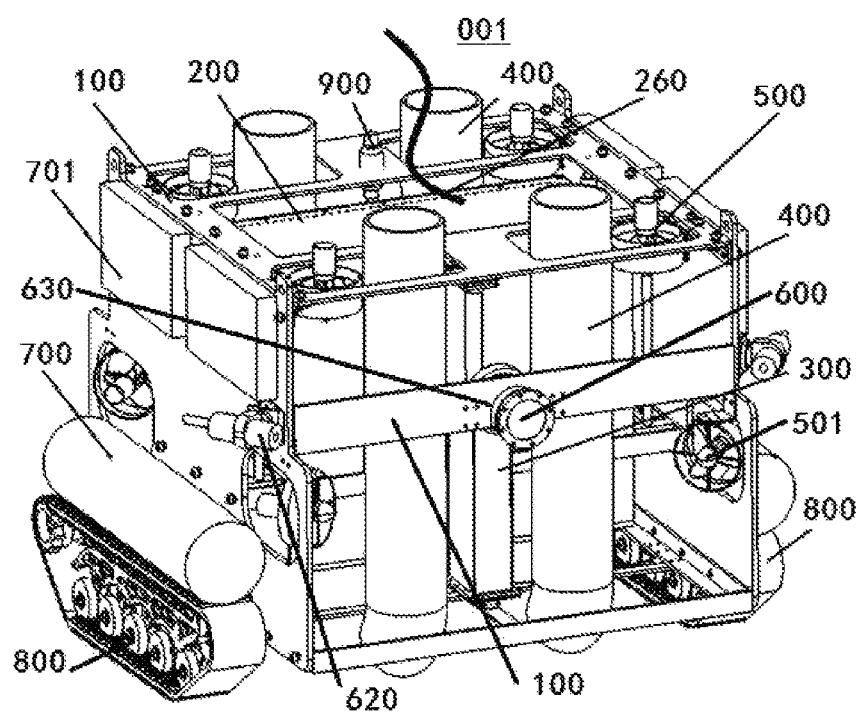
FIG. 2 is a structural schematic view of an inspection device provided in an embodiment of the present disclosure.

Referring to FIG. 2, FIG. 2 is a structural schematic view of an inspection device provided in an embodiment of the present disclosure. An embodiment of the present disclosure further provides an inspection device 001, wherein the inspection device 001 includes a rack 100 and the photographing apparatus 200; and the housing 210 is connected to the rack 100. The inspection device is at least configured to perform underwater photographing in a muddy water area to realize inspection.

Figure 3:
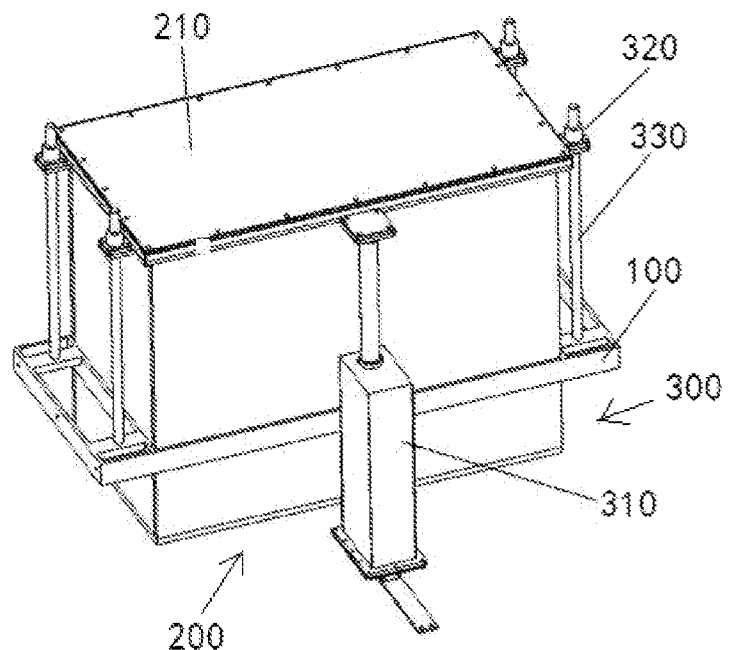
FIG. 3 is a structural schematic view of a housing and a lifting device provided in an embodiment of the present disclosure.

Optionally, referring to FIG. 3, FIG. 3 is a structural schematic view of the housing 210 and a lifting device 300 provided in an embodiment of the present disclosure. The inspection device 001 further includes the lifting device 300 provided on the rack 100; and the housing 210 is slidably connected to the rack 100, and the lifting device 300 is configured to drive the housing 210 to reciprocally move up and down so that the photographing portion 211 is away from or close to the to-be-photographed object. Optionally, a polish rod 330 (the polish rod 330 is provided in a vertical direction, a vertical direction when the inspection device travels normally) is connected to the rack 100, a linear bearing 320 is connected to the housing 210, and the linear bearing 320 is slidably connected to the polish rod 330, thus realizing the slidable connection between the housing 210 and the rack 100. Optionally, the lifting device 300 adopts a waterproof electric push rod 310; the waterproof electric push rod 310 is provided on the rack 100, and a lifting drive end of the waterproof electric push rod 310 is connected to the housing 210, to drive the housing 210 to reciprocate along the polish rod 330. For example, when the inspection device 001 is close to the bottom under water, the waterproof electric push rod 310 drives the housing 210 to move downwards, so that the photographing portion 211 can protrude from a bottom of the rack 100 to get close to and be attached to the to-be-photographed object at the bottom under water, and the waterproof electric push rod 310 drives the housing 210 to move upwards, so that the photographing portion 211 can be away from the underwater to-be-photographed object.

Figure 4:
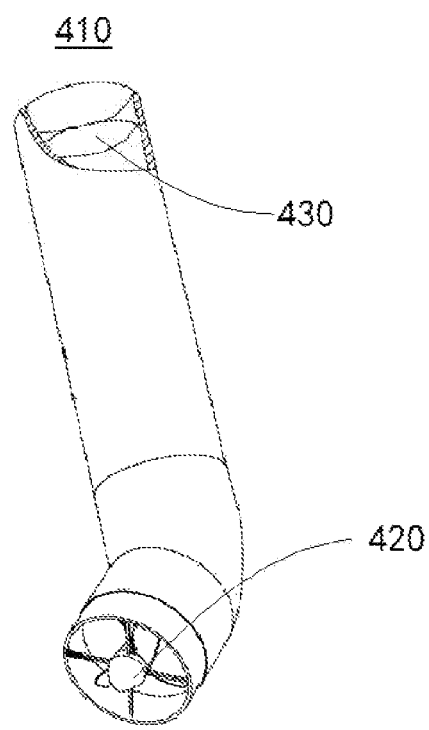
FIG. 4 is a structural schematic view of a dredging pipe provided in an embodiment of the present disclosure.

Optionally, referring to FIG. 2 again, the inspection device 001 further includes a dredging device 400 provided on the rack 100; an image acquisition region is formed on a side of the photographing portion 211 away from the space 250, and the dredging device 400 is configured to agitate coverings around the image acquisition region, so that the to-be-photographed object covered by the coverings is exposed in the image acquisition region. Optionally, with continued reference to FIG. 2, the dredging device 400 includes a dredging pipe 410, the dredging pipe 410 is vertically disposed, a top end of the dredging pipe 410 is a water inlet, a bottom end of the dredging pipe 410 is provided with a water outlet with an opening facing the photographing portion 211, and the upper clean water is guided from the inlet to the water outlet so as to flush out sludge and muddy water. Optionally, the dredging device 400 includes at least two dredging pipes 410, the at least two dredging pipes 410 are divided into two groups, and the two groups of dredging pipes 410 are symmetrically arranged at two sides of the underwater photographing apparatus 200. Optionally, the number of dredging pipes 410 is four, and the four dredging pipes 410 are pairwise arranged symmetrically on two sides of the housing 210. Optionally, referring to FIG. 4, FIG. 4 is a structural schematic view of the dredging pipe 410 provided in an embodiment of the present disclosure. The dredging pipe 410 includes a dredging propeller 420 provided at a bottom end and a filtering screen 430 provided at a top end, and the propeller makes water flow in from the inlet of the dredging pipe 410 and discharge the sludge from the water outlet. Functions of the filtering screen 430 include preventing large impurities such as branches from flowing in through the inlet to damage the propeller.

The operation principle of the dredging device 400 provided in the present embodiment includes: referring to FIG. 2 again, the inspection device 001 is moved to a position to be detected (with the to-be-photographed object), at this time, the dredging device 400 operates all the time, and continuously flushes the sludge in a travel route. The dredging device 400 operates to flush out the sludge below the housing 210. After a period of time, the lifting device 300 acts to move the housing 210 down to make the photographing portion 211 to be attached to the to-be-photographed object and stops the action, in this case, the camera 230 may photograph the to-be-photographed object via the photographing portion 211. The dredging device 400 operates cooperatively with the lifting device 300, wherein the housing 210 is lifted by the lifting device 300, and the dredging pipe 410 flushes to remove sludge around the image acquisition region, thus realizing the underwater photographing in the muddy water area.

Optionally, referring to FIG. 2 again, the inspection device 001 further includes a waterproof track 800 provided on the rack 100. Optionally, the bottom ends of two sides of the rack 100 are provided with the waterproof track 800, respectively. The waterproof track 800 mainly includes a rust-proof track chassis and a waterproof motor. In the above, the waterproof motor includes a casing and a motor sealed in the casing, and reference is made to the prior art for the sealing between a motor shaft and the casing. Functions of the waterproof track 800 include enabling the inspection device 001 to travel underwater when reaching the bottom underwater.

Optionally, referring to FIG. 2 again, the inspection device 001 further includes a first propeller 500 and a second propeller 501, wherein the first propeller 500 is configured to change a height position of the rack 100, and the second propeller 501 is configured to change a horizontal position of the rack 100. Optionally, four first propellers 500 are provided, and are divided into two groups, and the two groups of first propellers 500 are symmetrically arranged at two sides of the housing 210, and a propulsion direction is in a vertical plane; four second propellers 501 are provided, and divided into two groups, and the two groups of second propellers 501 are symmetrically arranged at two sides of the housing 210, and a propulsion direction is in a horizontal plane. Optionally, the first propeller 500 is provided at the top end of the rack 100, and the second propeller 501 is located below the first propeller 500. Functions of the first propeller 500 and the second propeller 501 include being capable of realizing movement of the inspection device 001 in six degrees of freedom, wherein when the inspection device 001 encounters an obstacle that the track cannot cross underwater, a robot can be lifted by the first propeller 500 to cross the obstacle, thus improving the environment adaptability of the inspection device 001 in underwater inspection, and when the inspection device 001 needs to float out of the water surface, an upward power is provided to enable the inspection device to float out of the water surface.

Optionally, referring to FIG. 2 again, the inspection device 001 further includes a buoyancy adjustable device 700 provided on the rack 100 to balance a state of the rack 100 in water. Optionally, the buoyancy adjustable device 700 includes a sleeve and a piston slidably fitted with the sleeve. When the piston is withdrawn, the whole volume increases, and the buoyancy of the inspection device 001 in water increases, and when the piston returns to the sleeve, the whole volume decreases, and the buoyancy of the inspection device 001 in water decreases. Optionally, the number of buoyancy adjustable devices 700 is two, and the buoyancy adjustable devices are mounted on two sides of the rack 100. There may be a plurality of buoyancy adjustable devices, as long as the buoyancy of the inspection device 001 is uniformly distributed. Functions of the buoyancy adjustable device 700 include changing magnitude of the buoyancy of the inspection device 001 in water by changing its own volume. The operation principle is as follows: when the inspection device 001 is to submerge or move for detection underwater, the volume of the buoyancy adjustable device 700 changes to a minimum, so as to decrease the buoyancy, so that the inspection device 001 can have sufficient frictional force underwater for movement of the chassis of the track; meanwhile, it is ensured that when the dredging device 400 dredges and when the dredging propeller 420 generates an upward thrust, the inspection device 001 can still land stably; and when the inspection device 001 is to float up, the buoyancy adjustable device 700 increases the volume to a maximum, to make the buoyancy of the whole inspection device 001 increased, so that the inspection device can float out of the water surface by its own buoyancy, thus reducing the actions of the first propeller 500, and saving electric energy.

Optionally, referring to FIG. 2 again, the inspection device 001 further includes a buoyancy block 701 to balance the state of the rack 100 in water. Optionally, a plurality of buoyancy blocks 701 are provided, and equally divided into two groups, and the two groups of buoyancy blocks 701 are arranged at two sides of the rack 100, so that a direction of a resultant force of the buoyancy coincides with a direction of center of gravity of the inspection device 001. Functions of the buoyancy block 701 includes distributing the buoyancy for the inspection device 001, and making the direction of resultant force of buoyancy and the direction of center of gravity of the whole inspection device 001 on a vertical line, so that the inspection device 001 can constantly keep its own posture in a normal operation posture when floating up, sinking down or suspending in water.

Figure 5:
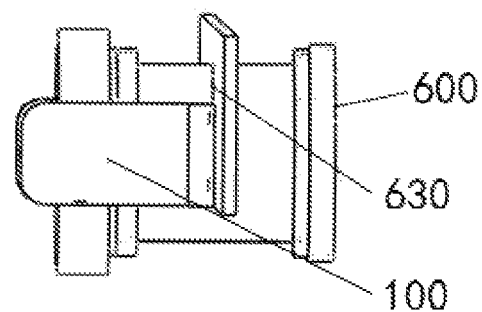
FIG. 5 is a structural schematic view of a photographing camera and a rack provided in an embodiment of the present disclosure.
Figure 6:
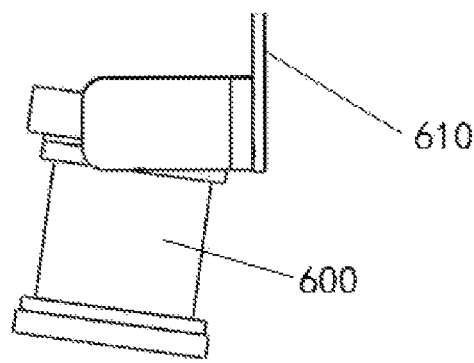
FIG. 6 is a structural schematic view of the photographing camera and a mounting bracket provided in an embodiment of the present disclosure.
Figure 7:
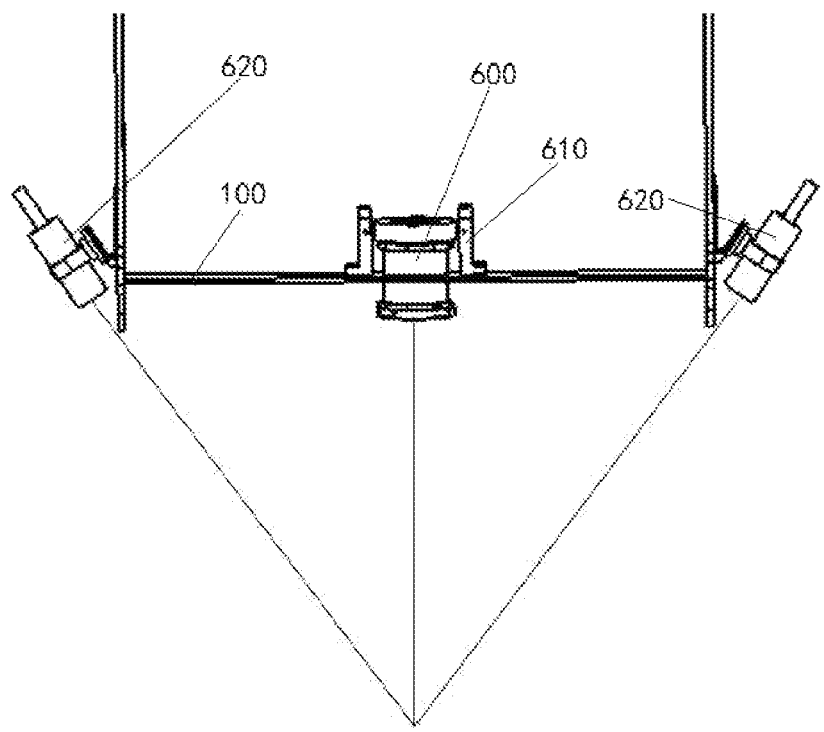
FIG. 7 is a structural schematic view of the photographing camera, an underwater light supplementing lamp, and the rack provided in an embodiment of the present disclosure.

Optionally, referring to FIG. 2 again, the inspection device 001 further includes a photographing camera 600; and the photographing camera 600 is connected to the rack 100 and has an adjustable photographing angle, so as to photograph different positions of the image acquisition region. Optionally, the photographing camera 600 is installed in front of the inspection device 001. With reference to FIG. 5, FIG. 6, and FIG. 7, FIG. 5 is a schematic structural view of the photographing camera 600 and the rack 100 provided in an embodiment of the present disclosure; FIG. 6 is a schematic structural view of the photographing camera 600 and a mounting bracket 610 provided in an embodiment of the present disclosure; and FIG. 7 is a structural schematic view of the photographing camera 600, an underwater light supplementing lamp 620, and the rack 100 provided in an embodiment of the present disclosure. Optionally, the inspection device 001 further includes the mounting bracket 610 and the underwater light supplementing lamp 620, the mounting bracket 610 is connected to the rack 100, and the photographing camera 600 is rotatably connected to the mounting bracket 610. Optionally, the photographing camera 600 and the mounting bracket 610 are rotatably connected with each other through a rotation shaft, and an axial line of the rotation shaft is located in a horizontal plane. The photographing camera 600 rotates in a vertical plane. Optionally, the rack 100 is provided with an arc-shaped notch 630 with an opening facing downward, and the photographing camera 600 can be clamped into the arc-shaped notch 630 when rotated upward. The arc-shaped notch 630 can at least restrict a limit position at which the camera 600 is rotated upward. Optionally, when the photographing camera 600 is clamped into the arc-shaped notch 630, a photographing direction of the lens of the photographing camera 600 is parallel to the horizontal plane, and is perpendicular to the vertical plane. Two underwater light supplementing lamps 620 are provided, and the two light supplementing lamps 242 are arranged at two sides of the photographing camera 600. A plurality of underwater light supplementing lamps 620 may be provided, and uniformly distributed at periphery of the photographing camera 600. By adjusting an angle of the underwater light supplementing lamps 620, a preferred light supplementing angle is found. Functions of the photographing camera 600 include observing an environment ahead of the inspection device 001 in the traveling direction thereof in real time, and being capable of adjusting the angle to photograph the dredging of the inspection device 001 and photograph an inspection process. The sight of the photographing camera 600 and ray of the underwater light supplementing lamps 620 are just on one point at a certain distance, and then the video camera is well supplemented with light.

Optionally, referring to FIG. 2 again, the inspection device 001 further includes an underwater acoustic positioning mechanism 900 provided on the top of the rack 100. The underwater acoustic positioning mechanism 900 is mounted on the top of the rack 100, with functions including interacting with onboard devices on water surface so as to position an underwater robot and determine a posture of the underwater robot, and reducing the influence of complex environment at the bottom of the rack 100 on the positioning of the underwater acoustic positioning mechanism 900.

An embodiment of the present disclosure provides a photographing apparatus 200 and an inspection device 001. Referring to FIG. 2 again, for example, the rack 100 is approximately of a rectangular parallelepiped structure, and an accommodating space 250 for mounting the housing 210 is formed at a middle part of the rack 100; dredging pipes 410 of the dredging device 400 are vertically provided on the rack 100, and are pairwise (two on each side) distributed symmetrically at two sides of the housing 210; four first propellers 500 are correspondingly provided at four corners on the top of the rack 100, and four second propellers 501 are correspondingly provided at four edges corresponding to the four corners; two waterproof tracks 800 are located at two sides of the bottom end of the rack 100; the two buoyancy adjustable devices 700 are located above the waterproof tracks 800, respectively; and two groups of buoyancy blocks 701 are located on two sides of the top end of the rack 100.

When the photographing apparatus 200 and the inspection device 001 provided in the embodiments of the present disclosure are used in the muddy water area, for example, the inspection device 001 travels forward underwater, and the dredging device 400 continuously dredges. When the inspection device 001 is close to the bottom underwater, the lifting device 300 drives the housing 210 to move downwards, so that the photographing portion 211 protrudes out of the rack 100 and is attached to the bottom under water, and after photographing the underwater to-be-photographed object via the photographing portion 211, the depth camera 230 transfers the photographed image of the to-be-photographed object to a computer for analysis, so as to obtain quantitative features of the underwater environment status.

The inspection device 001 provided in the present embodiment at least has the following advantages: the photographing apparatus 200 can photograph the underwater to-be-photographed object in the muddy water area, and also can photograph the bottom underwater to perform bottom inspection. The dredging device 400 can flush away the coverings in the image acquisition region, so that the photographing portion 211 can be directly attached to the to-be-photographed object, thus ensuring that the depth camera 230 can complete underwater photographing. When a complex operation environment is encountered, the inspection device can be pushed by the first propeller 500 and/or the second propeller 501, and the overall buoyancy of the inspection device 001 is changed by the buoyancy adjustable structure, thus realizing free movement with six degrees of freedom and avoiding barriers in water.

The above-mentioned are merely specific embodiments of the present disclosure, but the scope of protection of the present disclosure is not limited thereto, and changes and substitutions that might be easily envisaged by any person skilled familiar with the technical field within the technical scope disclosed in the present disclosure should fall within the scope of protection of the present disclosure. Therefore, the scope of protection of the present disclosure should be based on the scope of protection of the claims.

What is claimed is:

1. An inspection device, wherein the inspection device comprises a rack and a photographing apparatus;
   wherein the photographing apparatus comprises:
   a camera, a light supplementing structure, and a closed housing,
   wherein the housing is connected to the rack,
   wherein the camera is provided with a lens, and the camera is located in the housing and connected to the housing; the housing has at least one photographing portion, the photographing portion is configured to be attached to a to-be-photographed object, and a space is formed between the lens and the photographing portion; and
   the light supplementing structure is located in the housing and connected to the housing, the light supplementing structure is configured to emit light to the to-be-photographed object through the space and the photographing portion, and the lens is configured to shoot an image of the to-be-photographed object via the photographing portion,
   wherein the inspection device further comprises a lifting device provided on the rack; and
   the housing is slidably connected to the rack, and the lifting device is configured to drive the housing to reciprocally move up and down so that the photographing portion is away from or close to the to-be-photographed object.

2. The inspection device according to claim 1, wherein the inspection device further comprises a dredging device provided on the rack; and
   an image acquisition region is formed on a side of the photographing portion away from the space, and the dredging device is configured to agitate coverings around the image acquisition region, so that the to-be-photographed object covered by the coverings is exposed in the image acquisition region.

3. The inspection device according to claim 2, wherein the inspection device further comprises a photographing camera; and
   the photographing camera is connected to the rack and has an adjustable photographing angle, so as to photograph different positions of the image acquisition region.

4. The inspection device according to claim 1, wherein the inspection device further comprises a buoyancy adjustable device provided on the rack configured to balance a state of the rack in water.

5. The inspection device according to claim 1, wherein the light supplementing structure comprises a light supplementing lamp strip,
   wherein the light supplementing lamp strip is provided circumferentially around the photographing portion; and the lens is arranged towards a middle region of the photographing portion, and is configured to shoot an image of the to-be-photographed object via the middle region.

6. The inspection device according to claim 5, wherein the light supplementing structure further comprises a light supplementing lamp,
   wherein light emitted from the light supplementing lamp is parallel to an inner wall of the photographing portion.

7. The inspection device according to claim 6, wherein the housing is of a rectangular parallelepiped structure, and a bottom plate of the housing forms the photographing portion.

8. The inspection device according to claim 7, wherein the photographing apparatus further comprises an insulating plate, the insulating plate is located in the housing and connected to the housing, the space is formed between the insulating plate and the bottom plate, and the camera is mounted on the insulating plate.

* * * * *